United States Patent

Bennett

[11] Patent Number: 6,151,891
[45] Date of Patent: Nov. 28, 2000

[54] HEAT EXCHANGER FOR A MOTOR VEHICLE EXHAUST

[76] Inventor: Easton Bennett, P.O. Box 72036, Ottewell P.O., Edmonton, Alberta, Canada, T6B 3A7

[21] Appl. No.: 09/158,711

[22] Filed: Sep. 22, 1998

[51] Int. Cl.[7] ...................................................... F01N 3/00
[52] U.S. Cl. ................................ 60/298; 60/320; 165/51; 165/52
[58] Field of Search .............................. 60/298, 309, 320, 60/321, 310; 165/42, 52, 51

[56] References Cited

U.S. PATENT DOCUMENTS

| | | |
|---|---|---|
| 1,168,623 | 1/1916 | Furber . |
| 1,231,208 | 6/1917 | Semmler . |
| 1,884,538 | 10/1932 | Blake . |
| 2,919,540 | 1/1960 | Percival . |
| 3,158,192 | 11/1964 | Mizer . |
| 3,691,772 | 9/1972 | Cross . |
| 3,903,694 | 9/1975 | Aine .......................................... 60/274 |
| 4,272,958 | 6/1981 | Waltrip ...................................... 60/320 |
| 4,391,235 | 7/1983 | Majkrzak . |
| 4,424,775 | 1/1984 | Mayfield, Jr. . |
| 4,537,349 | 8/1985 | Stolz . |
| 4,593,748 | 6/1986 | Kramb ....................................... 60/320 |
| 4,611,466 | 9/1986 | Keedy . |
| 4,813,632 | 3/1989 | Woodhouse ............................... 60/309 |
| 5,005,542 | 4/1991 | Rissanen . |
| 5,033,264 | 7/1991 | Cabral ....................................... 60/274 |
| 5,551,384 | 9/1996 | Hollis . |
| 5,799,632 | 9/1998 | Bennett ................................. 123/142.5 |

OTHER PUBLICATIONS

Abstract, cover page and drawings from German patent 2829454, Jan. 1980, 5 pages.

Primary Examiner—Thomas Denion
Assistant Examiner—Binh Tran
Attorney, Agent, or Firm—Christensen O'Connor Johnson Kindness PLLC

[57] ABSTRACT

A heat exchanger for a motor vehicle exhaust includes an outer tubular body and an inner tubular body. The outer tubular body has peripheral sidewalls, an interior cavity, a first end and a second end. The inner tubular body has fluid impervious sidewalls formed out of a single length of conduit wound in a spiral coil. The spiral coil has an exterior surface and an interior surface. The inner tubular body is disposed within the interior cavity of the outer tubular body spaced from the peripheral sidewalls. This provides a first flow channel between the exterior surface of the inner tubular body and the peripheral sidewalls of the outer tubular body, and a second flow channel along the interior surface of the inner tubular body. The conduit of the spiral coil has an inlet end and an outlet end, whereby fluid is circulated through the coil.

13 Claims, 8 Drawing Sheets

HEAT EXCHANGER FOR A MOTOR VEHICLE EXHAUST

FIELD OF THE INVENTION

The present invention relates to a heat exchanger for motor vehicle exhaust.

BACKGROUND OF THE INVENTION

In a prior United States Patent Application, now U.S. Pat. No. 5,799,632, Easton Bennett taught how to improve heat transfer from a motor vehicle exhaust through the use of a tubular body having fluid impervious sidewalls formed out of a single length of conduit wound in a spiral coil. This structure brought the exhaust in closer contact with fluid to which a heat transfer was to be effected.

Experience has now shown that there are a variety of types of motor vehicles, the needs of which differ. In some makes of gasoline powered automobile the problem is one of heat management. A build up of heat occurs behind the catalytic converter and there exists a need to dissipate that heat. In contrast, diesel engines have a comparatively low heat production and there is a need to obtain maximum heat transfer from the exhaust gases that pass through the heat exchanger. In each case, there is a common problem of maximizing the rate of heat transfer, while avoiding heat build ups which could cause damage to the exhaust system or the engine.

SUMMARY OF THE INVENTION

What is required is a heat exchanger for a motor vehicle exhaust that has further enhanced heat transfer capability.

According to one aspect of the present invention there is provided a heat exchanger for a motor vehicle exhaust including an outer tubular body and an inner tubular body. The outer tubular body has peripheral sidewalls, an interior cavity, a first end and a second end. The inner tubular body has fluid impervious sidewalls formed out of a single length of conduit wound in a spiral coil. The spiral coil has an exterior surface and an interior surface. The inner tubular body is disposed within the interior cavity of the outer tubular body spaced from the peripheral sidewalls. This provides a first flow channel between the exterior surface of the inner tubular body and the peripheral sidewalls of the outer tubular body, and a second flow channel along the interior surface of the inner tubular body. The conduit of the spiral coil has an inlet end and an outlet end, whereby fluid is circulated through the coil. An exhaust pipe connection is provided at each of the first end and the second end of the outer tubular body, whereby exhaust from an exhaust pipe is diverted through the interior cavity of the outer tubular body.

With the heat exchanger, as described above, each side of the spiral transfer coil is exposed to exhaust gases which serves to improve the heat transfer rate.

Although beneficial results may be obtained through the use of the heat exchanger for a motor vehicle exhaust, as described above, even more beneficial results may be obtained when the outer tubular body has fluid impervious sidewalls formed out of a single length of conduit wound in a spiral coil, the conduit of the spiral coil having an inlet end and an outlet end, whereby fluid is circulated through the coil.

With this version of the heat exchanger there can be two streams of fluid being circulated through both the inner coil and the outer coil. This increases the volume of fluid being circulated and, thereby, improves the rate of heat transfer.

Although beneficial results may be obtained through the use of the heat exchanger for a motor vehicle exhaust, as described above, the more spiral coils provided the greater the volume of fluid that can be used for heat exchange. It is also preferable that both the inside surface and the outside surface of each spiral coil be exposed to hot exhaust gases. Even more beneficial results may, therefore, be obtained when there are several concentric inner tubular bodies.

Although beneficial results may be obtained through the use of the heat exchanger for a motor vehicle exhaust, as described above, the transfer rate is also related to the rate of flow of hot exhaust gases through the interior cavity of the outer tubular body. Even more beneficial results may, therefore, be obtained when the inner tubular body has a spiral baffle positioned in the second flow channel.

With this version of the heat exchanger, the spiral baffle slows down the axial flow of exhaust gases, thereby increasing the time over which heat transfer can take place. This feature is of greater importance with diesel engines, where the heat of the exhaust gases is not as extreme as with gasoline engines.

According to another aspect of the invention there is provided in combination a hydrocarbon fuelled engine; an exhaust system including a plurality of exhaust pipes; a closed loop fluid circulation conduit through which circulates one of lubricant or coolant; and a heat exchanger for a motor vehicle exhaust as described above.

Although beneficial results may be obtained through the use of the combination, as described above, lubricant and coolant are both sensitive to heat. If they are heated above threshold temperatures they start to deteriorate. Even more beneficial results may, therefore, be obtained when a temperature sensor coupled to a temperature actuated control valve is provided on the closed loop fluid circulation conduit. The control valve is closed to stop flow through the heat exchanger upon the temperature of fluid in the closed loop circulation conduit as sensed by the temperature sensor exceeding a preset temperature threshold actuation temperature of the control valve.

Although beneficial results may be obtained through the use of the combination, as described above, when the control valve closes there is a danger that fluid may be trapped within the heat exchanger. Even more beneficial results may, therefore, be obtained when a pump is connected to the outlet end of the conduit forming the spiral coil, whereby fluid is pumped from the spiral coil after the control valve has closed to stop further flow through the heat exchanger.

Although beneficial results may be obtained through the use of the combination, as described above, heat results in expansion of most fluids. Even more beneficial results may, therefore, be obtained when an overflow drain line is connected to the closed loop fluid circulation conduit, whereby excess fluid is diverted from said closed loop fluid circulation conduit. It is preferred that an overflow container is connected to a remote end of the drain line to maintain the integrity of the closed loop system and prevent environmental contamination.

Although beneficial results may be obtained through the use of the combination, as described above, should the pump fail and fluid become trapped within the heat exchanger pressure in the closed loop circulation conduit will rise. Even more beneficial results may, therefore, be obtained when a pressure relief valve is provided on the closed loop fluid circulation conduit thereby providing relief against pressure build up within said closed loop fluid circulation conduit.

Although beneficial results may be obtained through the use of the combination, as described above, there are various places along the exhaust system where the heat exchanger can be positioned. The most extreme heat problem in the exhaust system tends to be at the catalytic converter. Even more beneficial results may, therefore, be obtained when the exhaust system includes a catalytic converter and the heat exchanger is connected to the exhaust system downstream or and immediately adjacent to the catalytic converter.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
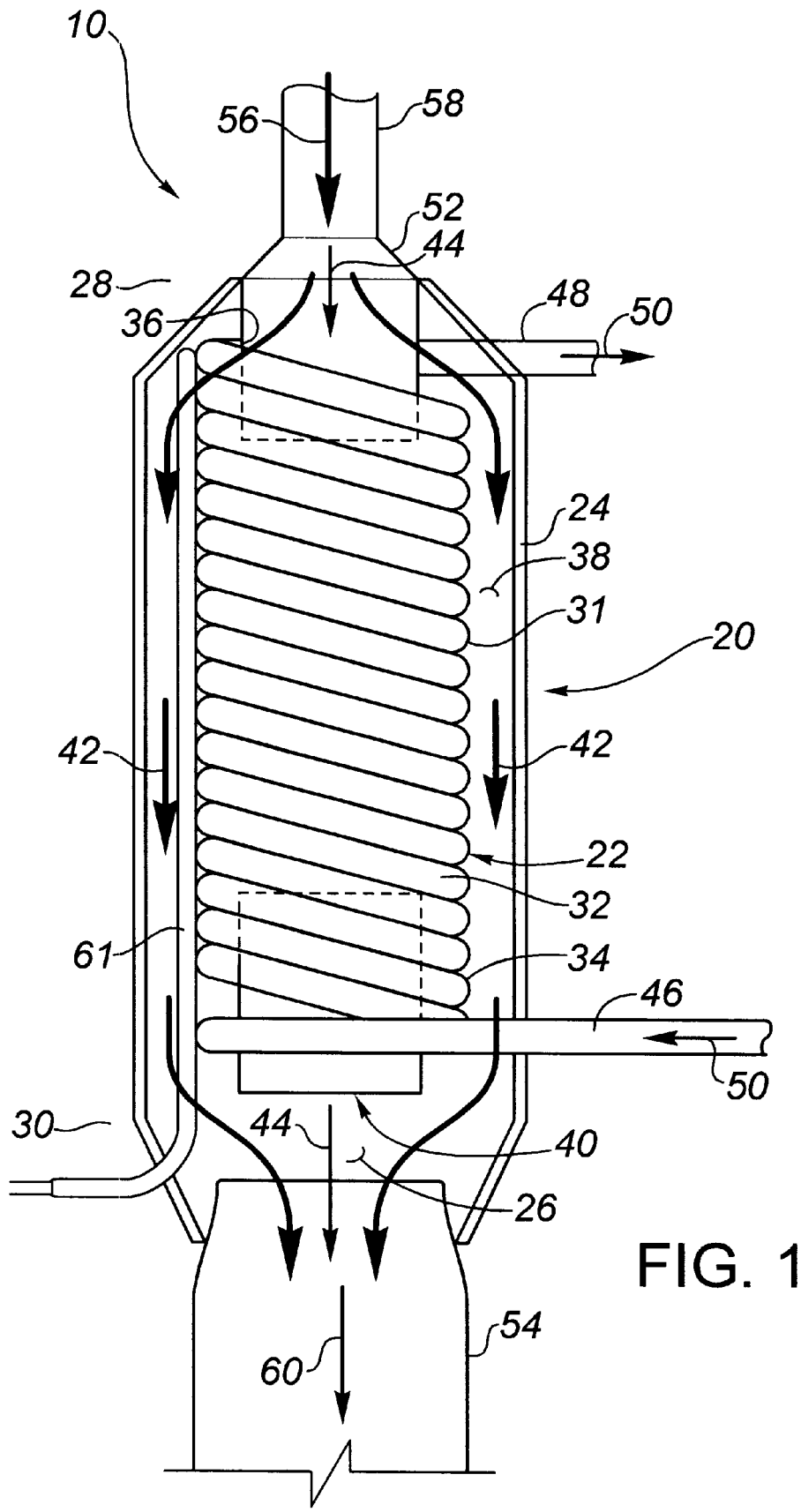
FIG. 1 is a schematic diagram of a first embodiment heat exchanger for a motor vehicle exhaust constructed in accordance with the teachings of the present invention combined in combination with a motor vehicle exhaust.

Several preferred embodiments of heat exchanger for a motor vehicle exhaust will hereinafter be described. A first embodiment, generally identified by reference numeral 10, will be described with reference to FIG. 1. A second embodiment, generally identified by reference numeral 12, will be described with reference to FIG. 2. A third embodiment, generally identified by reference numeral 13, will be described with reference to FIG. 3. A fourth embodiment, generally identified by reference numeral 14, will be described with reference to FIG. 4. A fifth embodiment, generally identified by reference numeral 16, will be described with reference to FIG. 5. A sixth embodiment, generally identified by reference numeral 17, will be described with reference to FIG. 6. A combination of a hydrocarbon fuelled engine and an exhaust system including a plurality of heat exchangers which can be of any one of the first, second, third, fourth, fifth or sixth embodiments above and a plurality of exhaust pipes will be described with reference to FIGS. 7 and 8.

Referring to FIG. 1, first embodiment of heat exchanger 10 for a motor vehicle exhaust comprises an outer tubular body 20 and an inner tubular body 22. Outer tubular body 20 has peripheral sidewalls 24, an interior cavity 26, a first end 28 and a second end 30. Inner tubular body 22 has fluid impervious sidewalls 31 formed out of a single length of conduit wound in a spiral coil 32 which has an exterior surface 34 and an interior surface 36. Inner tubular body 22 is disposed within the interior cavity 26 of outer tubular body 20 so that spiral coil 32 is spaced from the peripheral sidewalls 24, thereby providing a first flow channel 38 between the exterior surface 34 of the inner tubular body 22 and the peripheral sidewalls 24 of the outer tubular body 20, and a second flow channel 40 along the interior surface 36 of the inner tubular body 22. The directions of flow of fluids in first flow channel 38 is shown by arrows 42 and the direction of flow in second flow channel 40 is shown by arrows 44. The conduit of the spiral coil 32 has an inlet end 46 and an outlet end 48 whereby fluid is circulated through coil 32 in the direction shown by the arrows 50. Exhaust pipe connections 52 and 54 at each of the first end 28 and the second end 30 of the outer tubular body 20 respectively permit exhaust 56 from an exhaust pipe 58 to be diverted through interior cavity 26 of outer tubular body 20 before venting in the direction shown by arrow 60. When heat exchanger 10 is not in operation, fluid may be pumped from spiral coil 32 via conduit 61.

Figure 2:
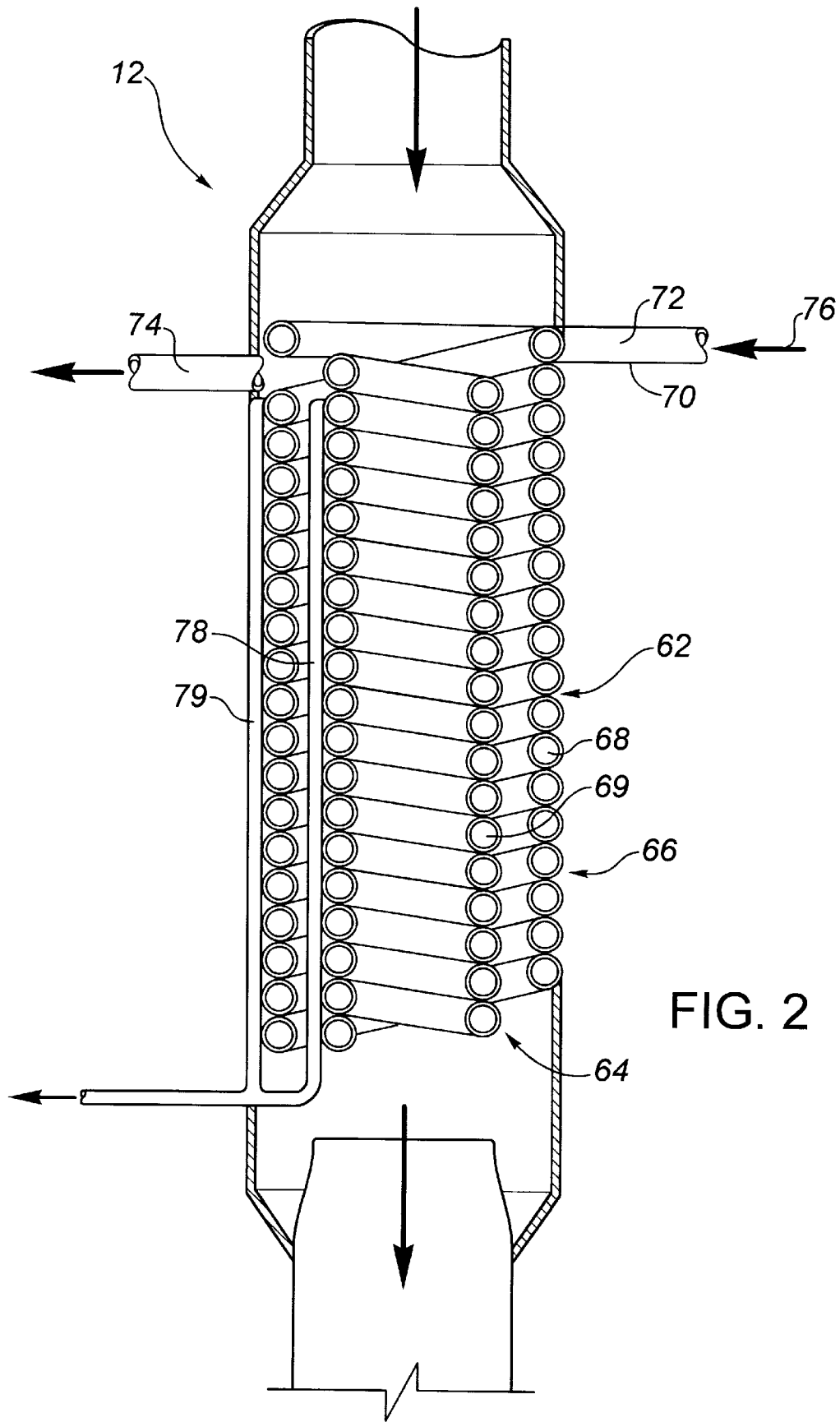
FIG. 2 is side elevation, in section, of a second embodiment of heat exchanger.

With reference to FIG. 2, second embodiment of heat exchanger 12 for a motor vehicle exhaust includes an outer tubular body 62 and an inner tubular body 64 formed out of a single length of conduit 66 wound in a concentric double spiral coil 68 and 69. Conduit 66 has fluid impervious sidewalls 70, an inlet end 72 and an outlet end 74, whereby fluid is circulated through the spiral coils 68 and 69 in the direction shown by the arrow 76. When heat exchanger 12 is not in operation, fluid may be pumped from spiral coils 68 and 69 via conduits 78 and 79.

Figure 3:
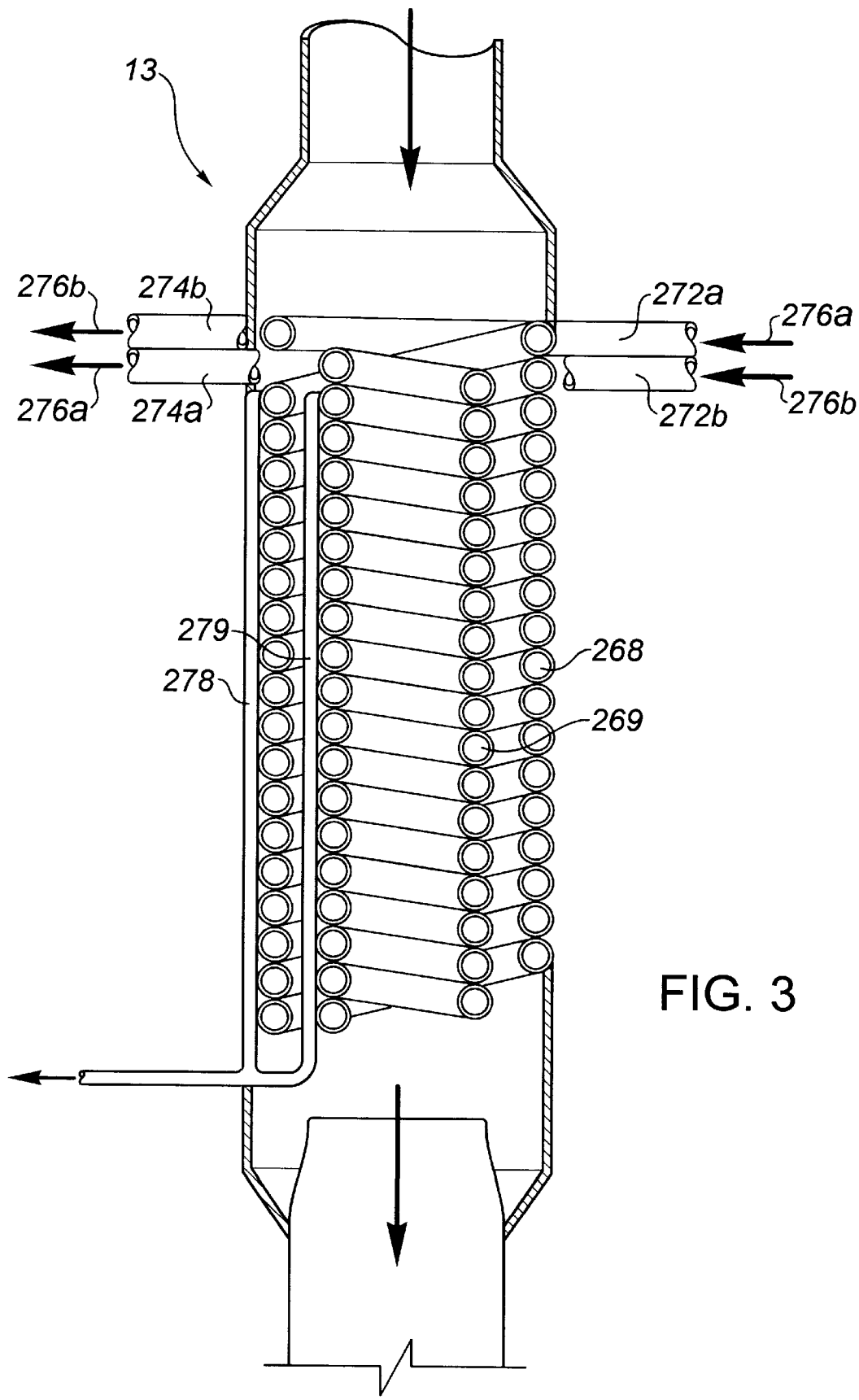
FIG. 3 is a side elevation, in section, of a third embodiment of heat exchanger.

With reference to FIG. 3, third embodiment of heat exchanger 13 is substantially similar in construction to heat exchanger 12, illustrated in FIG. 2. However, instead of a single length of conduit 66 wound in a concentric double spiral coil 68 and 69 there are two separate and distinct spiral coils 268 and 269 arranged concentrically. Each of coils 268 and 269 has a separate inlet, 272a and 272b, respectively and a separate outlet, 274a and 274b, respectively. Fluid is circulated through spiral coil 268 in the direction shown by the arrow 276a. Fluid is circulated through spiral coil 269 in the direction shown by the arrow 276b. When heat exchanger 13 is not in operation, fluid may be pumped from spiral coils 268 and 269 via conduits 278 and 279, respectively.

Figure 4:
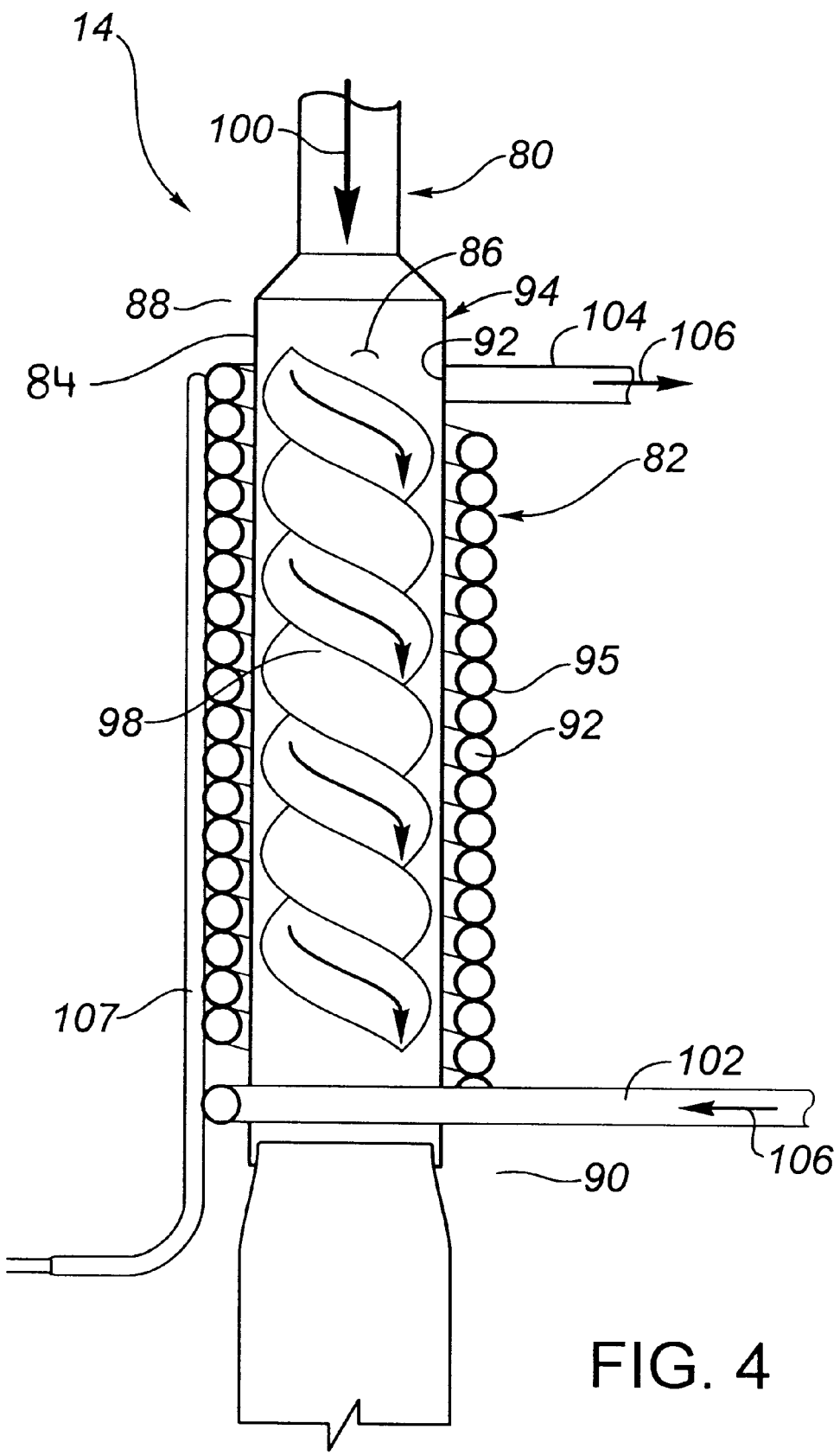
FIG. 4 is a side elevation, in section, of a fourth embodiment of heat exchanger.

With reference to FIG. 4, fourth embodiment of heat exchanger 14 for a motor vehicle exhaust has an inner tubular body 80 and an outer tubular body 82. Inner tubular body 80 has fluid impervious peripheral sidewalls 84, an interior cavity 86, a first end 88 and a second end 90. Sidewalls 84 have an interior surface 92 and an outer surface 94. Outer tubular body 82 has fluid impervious sidewalls 95 and is formed out of a single length of conduit wound in a spiral coil 96. Outer tubular body 82 is disposed concentrically around inner tubular body 80 so that spiral coil 92 is wound around the peripheral sidewalls 84. Inner tubular body 80 has a spiral baffle 98 positioned in the flow channel in interior cavity 86, with flow in the direction indicated by the arrow 100. Outer tubular body 82 has an inlet end 102 and an outlet end 104 whereby fluid is circulated through the spiral coil 92 in the direction shown by the arrow 106. When heat exchanger 14 is not in operation, fluid may be pumped from spiral coil 92 through conduit 107.

Figure 5:
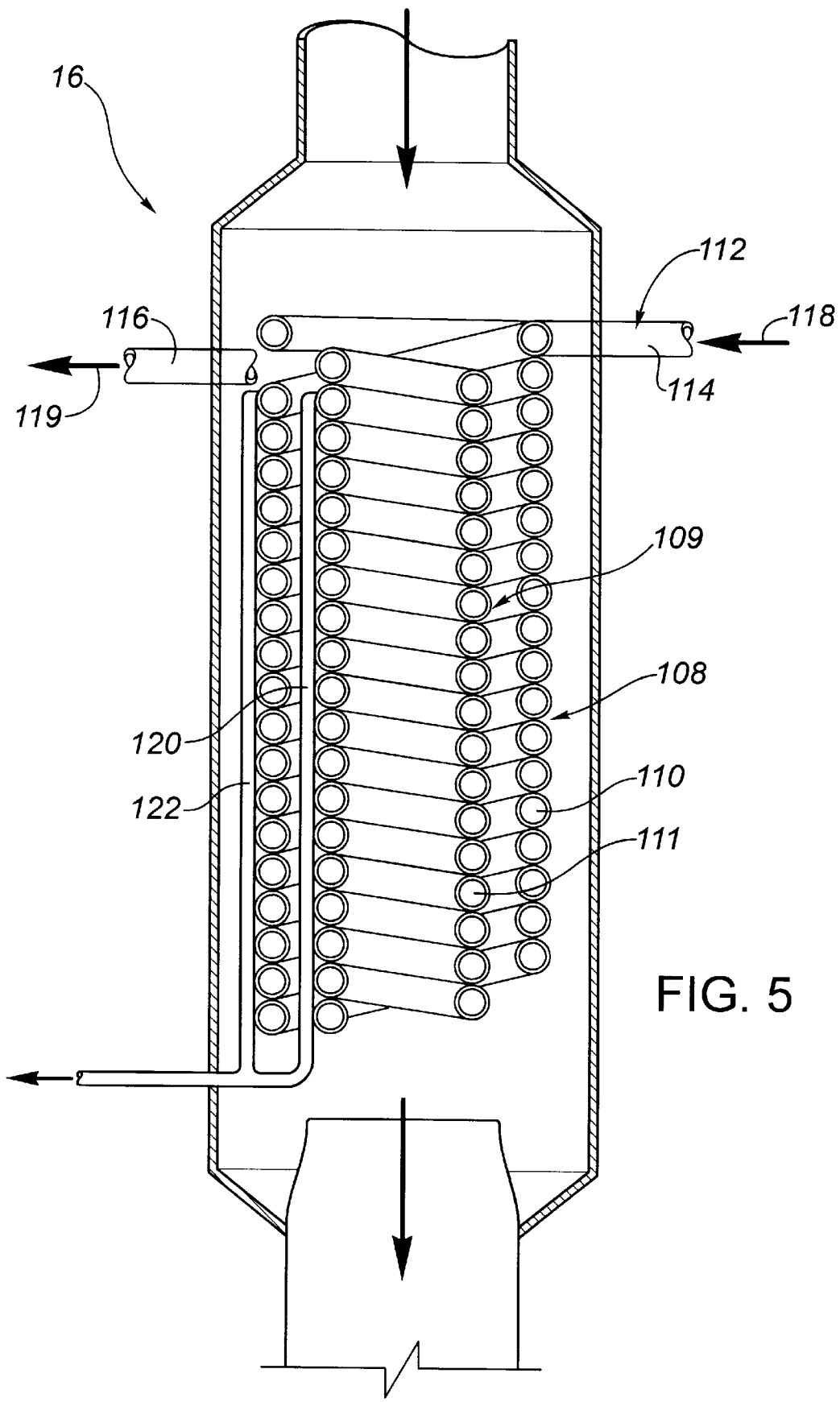
FIG. 5 is a side elevation, in section, of a fifth embodiment of a heat exchanger.

With reference to FIG. 5, fifth embodiment of heat exchanger 16 for a motor vehicle exhaust has several concentric inner tubular bodies 108 and 109. Tubular bodies 108 and 109 are formed out of a single length of conduit 112 wound in concentric multiple spiral coils 110 and 111. Conduit 112 has an inlet end 114 and an outlet end 116 whereby fluid is circulated through spiral coils 110 and 111 in the direction shown by the arrows 118 and 119. When heat exchanger 16 is not in operation, fluid may be pumped from spiral coils 110 and 111 through conduits 120 and 122.

Figure 6:
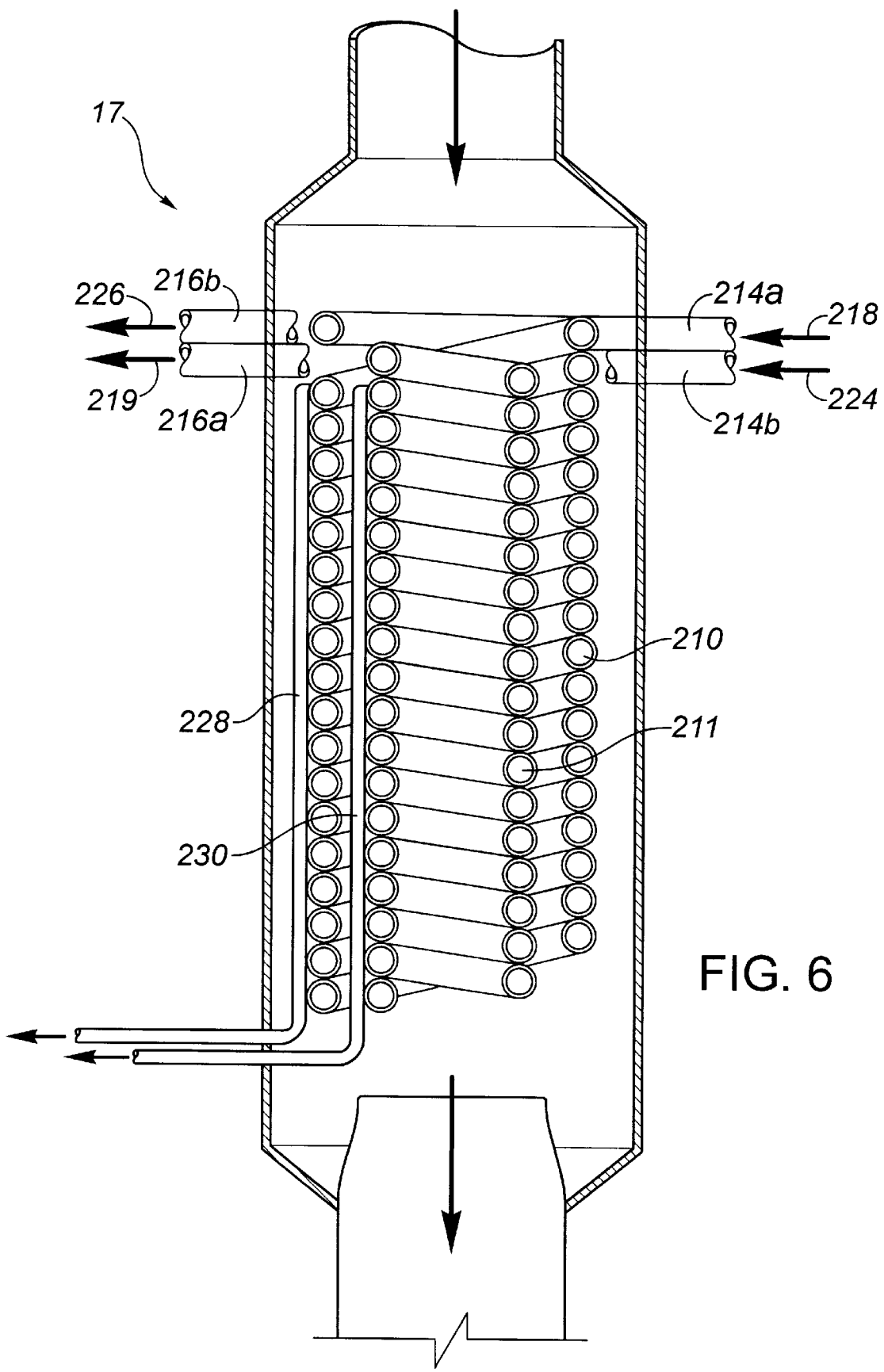
FIG. 6 is a side elevation, in sedtion, of a sixth embodiment of a heat exchanger.

With reference to FIG. 6, sixth embodiment of heat exchanger 17 for a motor vehicle exhaust is substantially similar in construction to heat exchanger 16, illustrated in FIG. 5. However, instead of a single length of conduit 112 wound in concentric multiple spiral coils 110 and 111, there are two separate and distinct spiral coils 210 and 211 arranged concentrically. Coils 210 and 211 have separate inlets 214a and 214b, respectively and separate outlets 216a and 216b, respectively. Fluid is circulated through the spiral coil 210 in the direction shown by the arrows 218 and 219. Fluid is circulated through the spiral coil 211 in the direction shown by the arrows 224 and 226. When heat exchanger 17 is not in operation, fluid may be pumped from spiral coils 210 and 211 through conduits 228 and 230.

Figure 7:
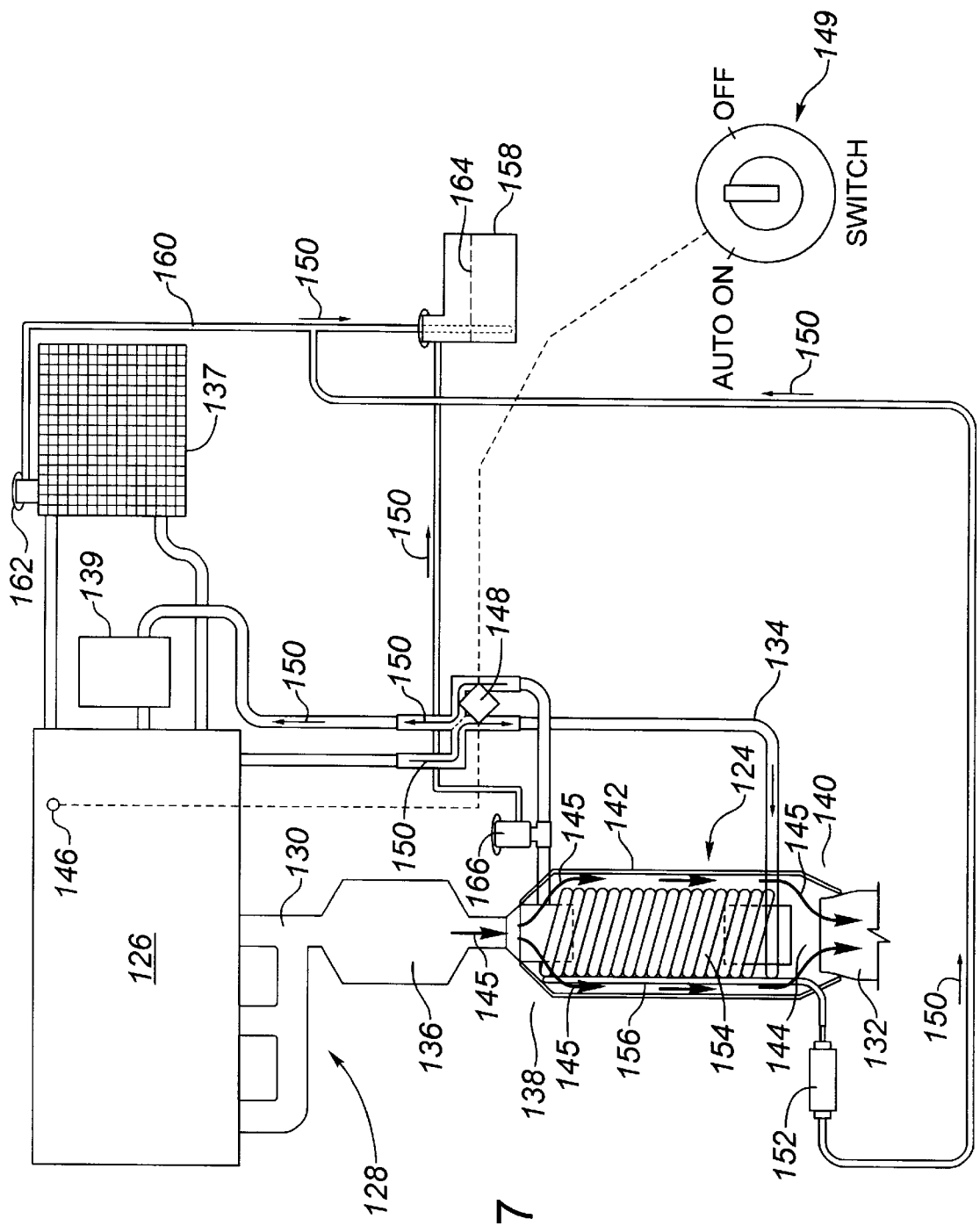
FIG. 7 is a schematic for a plurality of exhause pipes useful with the heat exchangers of the present invention.

With reference to FIG. 7, at least one heat exchanger 124 selected from heat exchanger 10, heat exchanger 12, heat exchanger 13, heat exchanger 14, heat exchanger 16 or heat exchanger 17 is used in combination with a hydrocarbon fuelled engine 126, and an exhaust system 128. Exhaust system 128 includes a plurality of exhaust pipes 130 and 132, and a catalytic converter 136. The system is capable of being used to heat either lubricant or coolant. Coolant circulates through closed loop fluid recirculation system 134 to radiator 137 or heater core 139. The coolant is heated to improve operation of heater core 139. In summer operation, the emphasis is dissipating heat build in the vicinity of the catalytic converter 136. Engine lubricant can similarly be passed through closed loop fluid recirculation conduit 134. The heating of engine lubricant improves the operation of engine 126 during periods of extremely cold weather.

Exhaust heat exchanger 124 is secured at each of a first end 138 and a second end 140 of an outer tubular body 142 to exhaust pipes 130 and 132, whereby exhaust from the exhaust system 128 is diverted through the interior cavity 144 of outer tubular body 142. The direction of flow of the exhaust is indicated by arrows 145.

A temperature sensor 146 located in engine 126 is coupled to a temperature actuated two-way control valve 148 provided on closed loop fluid circulation conduit 134. A switch 149 is used remotely to set two-way control valve 148 to either an "off" position or an "on" position. The direction of fluid flow in closed loop fluid circulation conduit 134 is indicated by arrows 150. Control valve 148 is closed to stop flow through heat exchanger 124 upon the temperature of fluid in closed loop circulation conduit 134 as sensed by temperature sensor 146 exceeding a preset temperature threshold actuation temperature of control valve 148. A pump 152 is connected to the outlet end of closed loop fluid recirculation conduit 134, whereby fluid is pumped from spiral coil 154 after control valve 148 has closed to stop further flow through heat exchanger 124. An overflow drain line 156 is connected to closed loop fluid circulation conduit 134, whereby excess fluid is diverted from said closed loop fluid circulation conduit 134 to a fluid overflow container 158. An overflow drain line 160 is connected to access port 162 of radiator 137, whereby excess fluid is drained from radiator 137 to overflow container 158. The level of the fluid in overflow container 158 is indicated by dashed line 164. A pressure relief valve 166 is provided on closed loop fluid circulation conduit 134 thereby providing relief against pressure build up within said closed loop fluid circulation conduit 134. Heat exchanger 124 is connected to exhaust system 128 downstream from and preferably immediately adjacent to catalytic converter 136.

Figure 8A:
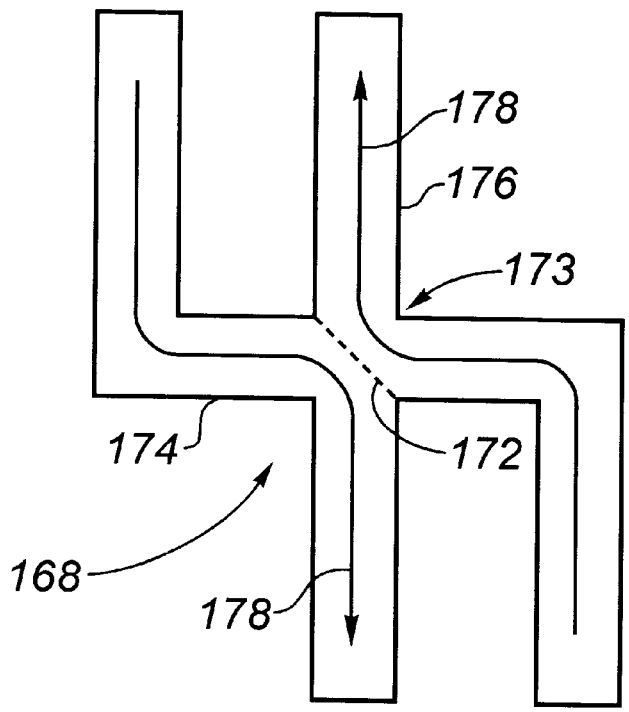
FIG. 8 is a plan view of exhause pipes useful in the schematic of FIG. 7.
Figure 8B:
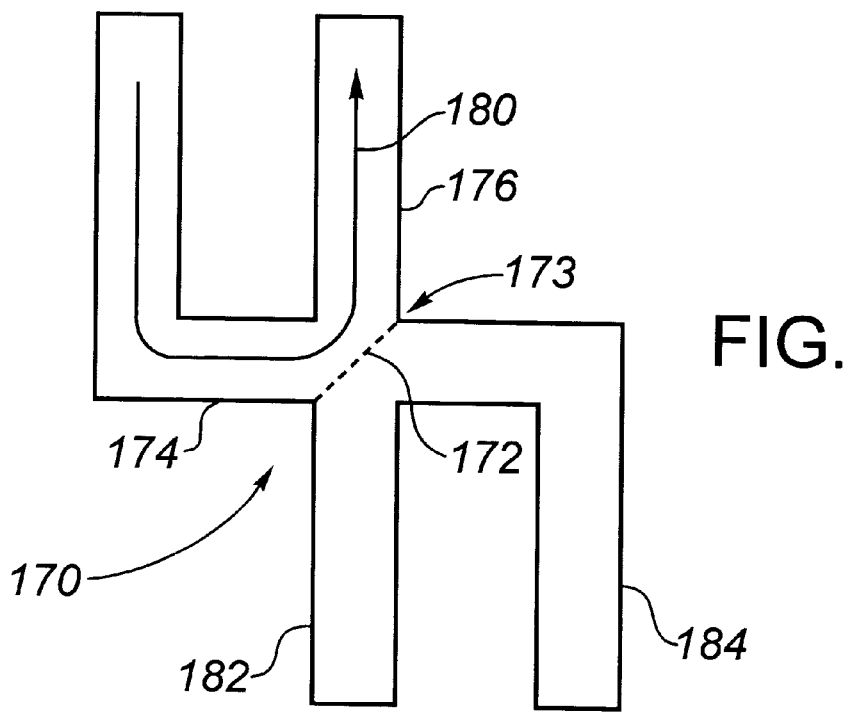

Referring to FIG. 8, two-way shut off valve 148 can be set to either of an "on" position 168 or an "off" position 170 using switch 149. When two-way shut off valve 148 is in the on position 168 a barrier 172 at a junction 173 between sections 174 and 176 of closed loop fluid recirculation conduit 134 is positioned to prevent flow of fluid from conduit section 174 to conduit section 176, thereby causing the fluid to flow through the entire length of closed loop fluid circulation conduit 134. The direction of flow of the fluid is indicated by arrows 178. When two-way shut off valve 148 is in the off position 170 barrier 172 at junction 173 is positioned to permit flow of fluid from conduit section 174 to conduit section 176. The direction of flow of fluid in conduit sections 174 and 176 is indicated by arrow 180. When two-way shut off valve 148 is in the off position sections 182 and 184 of closed loop fluid recirculation conduit 134, safety relief valve 166 and coil 154 of heat exchanger 124 are isolated from the remaining sections of closed loop fluid recirculation conduit 134. Consequently there is no flow of fluid in conduit sections 182 and 184 or coil 154.

The present invention can be used to preheat engine oil, hydraulic oil, transmission oil or fluids used in the heater. The use of multiple coils enables two or more fluid streams to be preheated at the same time. This provides a number of benefits. It reduces interior heat up time and generally improves interior heating. It reduces engine warm up time and generally increases the operating temperature of the engine for winter use. It reduces fuel consumption during warm up, by reducing engine and interior warm up time. It reduces emissions on cold start up.

A separate problem is the build up of heat that is occurring in automotive exhaust systems in the area of the catalytic converter. To dissipate such heat build up, a liquid can be run through multiple coils positioned in the exhaust. In hot weather operation, the sole purpose of the multiple coils can be heat dissipation and the liquid circulated can be dedicated to that purpose. The liquid can be passed through cooling fins or other such means to release the heat from the liquid prior to recirculation through the multiple coils.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A heat exchanger for a motor vehicle exhaust, comprising:

an outer tubular body having peripheral sidewalls, an interior cavity, a first end and a second end;

an inner tubular body having fluid impervious sidewalls formed out of a single length of conduit wound in a spiral coil, the spiral coil having an exterior surface and an interior surface, the inner tubular body disposed within the interior cavity of the outer tubular body spaced from the peripheral sidewalls, thereby providing a first flow channel between the exterior surface of the inner tubular body and the peripheral sidewalls of the outer tubular body, and a second flow channel along the interior surface of the inner tubular body;

the conduit of the spiral coil having an inlet end and an outlet end, whereby fluid is circulated through the coil;

an exhaust pipe connection at each of the first end and the second end of the outer tubular body, whereby exhaust from an exhaust pipe is diverted through the interior cavity of the outer tubular body.

2. The heat exchanger for a motor vehicle exhaust as defined in claim 1, wherein the outer tubular body has fluid impervious sidewalls formed out of a single length of conduit wound in a spiral coil, the conduit of the spiral coil having an inlet end and an outlet end, whereby fluid is circulated through the coil.

3. A heat exchanger for a motor vehicle exhaust, comprising:

an outer tubular body having peripheral sidewalls, an interior cavity, a first end and a second end;

an inner tubular body having fluid impervious sidewalls formed out of a single length of conduit wound in a spiral coil, the spiral coil having an exterior surface and an interior surface, the inner tubular body disposed within the interior cavity of the outer tubular body spaced from the peripheral sidewalls, thereby providing a first flow channel between the exterior surface of the inner tubular body and the peripheral sidewalls of the outer tubular body, and a second flow channel along the interior surface of the inner tubular body;

the conduit of the spiral coil having an inlet end and an outlet end, whereby fluid is circulated through the coil; and an exhaust pipe connection at each of the first end and the second end of the outer tubular body, whereby exhaust from an exhaust pipe is diverted through the interior cavity of the outer tubular body;

wherein the inner tubular body has a spiral baffle positioned in the second flow channel.

4. A heat exchanger for a motor vehicle exhaust, comprising:

an outer tubular body having peripheral sidewalls, an interior cavity, a first end and a second end;

an inner tubular body having fluid impervious sidewalls formed out of a single length of conduit wound in a spiral coil, the spiral coil having an exterior surface and an interior surface, the inner tubular body disposed within the interior cavity of the outer tubular body spaced from the peripheral sidewalls, thereby providing a first flow channel between the exterior surface of the inner tubular body and the peripheral sidewalls of the outer tubular body, and a second flow channel along the interior surface of the inner tubular body;

the conduit of the spiral coil having an inlet end and an outlet end, whereby fluid is circulated through the coil;

an exhaust pipe connection at each of the first end and the second end of the outer tubular body, whereby exhaust from an exhaust pipe is diverted through the interior cavity of the outer tubular body, wherein there are several concentric inner tubular bodies.

5. In combination:

a hydrocarbon fuelled engine;

an exhaust system including a plurality of exhaust pipes;

a closed loop fluid circulation conduit through which circulates one of lubricant and coolant;

a heat exchanger for a motor vehicle exhaust, comprising:
an outer tubular body having peripheral sidewalls, an interior cavity, a first end and a second end;
an inner tubular body having fluid impervious sidewalls formed out of a single length of conduit wound in a spiral coil, the spiral coil having an exterior surface and an interior surface, the inner tubular body disposed within the interior cavity of the outer tubular body spaced from the peripheral sidewalls, thereby providing a first flow channel between the exterior surface of the inner tubular body and the peripheral sidewalls of the outer tubular body, and a second flow channel along the interior surface of the inner tubular body;
the conduit of the spiral coil having an inlet end and an outlet end, the inlet end and the outlet end being connected to the closed loop fluid circulation conduit whereby one of lubricant or coolant is circulated through the coil;
an exhaust pipe connection at each of the first end and the second end of the outer tubular body, each of the first end and the second end being secured to exhaust pipes whereby exhaust from the exhaust system is diverted through the interior cavity of the outer tubular body; and
the inner tubular body of the heat exchanger having a spiral baffle positioned in the second flow channel.

6. The combination as defined in claim 5, wherein the outer tubular body of the heat exchanger has fluid impervious sidewalls formed out of a single length of conduit wound in a spiral coil, the conduit of the spiral coil having an inlet end and an outlet end, whereby a fluid is circulated through the coil.

7. The combination as defined in claim 5, wherein there are several concentric inner tubular bodies.

8. The combination as defined in claim 5, wherein a temperature sensor coupled to a temperature actuated control valve is provided on the closed loop fluid circulation conduit, whereby the control valve is closed to stop flow through the heat exchanger upon the temperature of fluid in the closed loop circulation conduit as sensed by the temperature sensor exceeding a preset temperature threshold actuation temperature of the control valve.

9. The combination as defined in claim 8, wherein a pump is connected to the outlet end of the conduit forming the spiral coil, whereby fluid is pumped from the spiral coil after the control valve has closed to stop further flow through the heat exchanger.

10. The combination as defined in claim 8, wherein an overflow drain line is connected to the closed loop fluid circulation conduit, whereby excess fluid is diverted from said closed loop fluid circulation conduit.

11. The combination as defined in claim 10, wherein an overflow container is connected to a remote end of the drain line.

12. The combination as defined in claim 5, wherein a pressure relief valve is provided on the closed loop fluid circulation conduit thereby providing relief against pressure build up within said closed loop fluid circulation conduit.

13. The combination as defined in claim 5, wherein the exhaust system includes a catalytic converter and the heat exchanger is connected to the exhaust system downstream or and immediately adjacent to the catalytic converter.

* * * * *